(12) United States Patent
Dentinger et al.

(10) Patent No.: US 7,816,044 B1
(45) Date of Patent: *Oct. 19, 2010

(54) FUEL CELL USING A HYDROGEN GENERATION SYSTEM

(75) Inventors: Paul M. Dentinger, Sunol, CA (US); Jeffrey A. W. Crowell, Castro Valley, CA (US)

(73) Assignee: Sandia Corporation, Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/719,448

(22) Filed: Mar. 8, 2010

Related U.S. Application Data

(62) Division of application No. 12/045,884, filed on Mar. 11, 2008.

(60) Provisional application No. 60/918,159, filed on Mar. 14, 2007.

(51) Int. Cl.
| | |
|---|---|
| *H01M 8/04* | (2006.01) |
| *H01M 4/00* | (2006.01) |
| *H01M 14/00* | (2006.01) |
| *H01M 8/06* | (2006.01) |
| *C01B 3/02* | (2006.01) |
| *C01B 3/24* | (2006.01) |
| *B01J 7/00* | (2006.01) |

(52) U.S. Cl. ............... 429/416; 429/492; 429/5; 48/61; 423/648.1

(58) Field of Classification Search .......... 429/34, 429/27; 423/648.1
See application file for complete search history.

(56) References Cited

U.S. PATENT DOCUMENTS

| | | | | |
|---|---|---|---|---|
| 2002/0006533 | A1* | 1/2002 | Bergman | 429/12 |
| 2007/0077480 | A1* | 4/2007 | Curello et al. | 429/34 |
| 2007/0231252 | A1* | 10/2007 | Loan et al. | 423/648.1 |

OTHER PUBLICATIONS

Ungar, G., "Radiation effects in polyethylene and n-alkanes", Journal of Materials Science 16 (1981) pp. 2635-2656.*
Freeman, Benny, D., "Transport of Small Molecules in Polymers: Overview of Research Activities", Department of Chemical Engineering, University of Texas at Austin, Mar. 2006. Retrieved from: http://web.engr.utexas.edu/che/students/graduate/05_graduate_presentations/freeman.pdf.*

* cited by examiner

*Primary Examiner*—Jonathan Crepeau
*Assistant Examiner*—Kenneth Douyette
(74) *Attorney, Agent, or Firm*—Timothy P. Evans

(57) ABSTRACT

A system is described for storing and generating hydrogen and, in particular, a system for storing and generating hydrogen for use in an $H_2/O_2$ fuel cell. The hydrogen storage system uses beta particles from a beta particle emitting material to degrade an organic polymer material to release substantially pure hydrogen. In a preferred embodiment of the invention, beta particles from $^{63}Ni$ are used to release hydrogen from linear polyethylene.

9 Claims, 1 Drawing Sheet

FUEL CELL USING A HYDROGEN GENERATION SYSTEM

CROSS-REFERENCE TO RELATED APPLICATIONS

This application is a divisional application of prior co-pending U.S. application Ser. No. 12/045,884 filed Mar. 11, 2008 entitled "Hydrogen Storage and Generation System," which claims priority to prior provisional U.S. Patent Application Ser. No. 60/918,159 originally filed Mar. 14, 2007.

STATEMENT OF GOVERNMENT INTEREST

This invention was made with Government support under contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

FIELD OF THE INVENTION

This invention is directed generally to a system and method for the generation and storage of hydrogen and particularly as a source of hydrogen and the generation thereof for use in a fuel cell. In this invention an organic polymer material is employed as the hydrogen source and an associated beta particle emitter is used to release hydrogen from the organic polymer material for further application.

BACKGROUND OF THE INVENTION

A fuel cell is a device for converting the chemical energy of a fuel directly into electrical energy in a continuous process. Although, in principle the nature of the reactants is not limited, the fuel cell reaction almost always involves the combination of hydrogen in some form with oxygen. Consequently, hydrogen generation and storage is a requirement for the pervasive introduction of fuel cells into the marketplace. To date, many options have been utilized for the hydrogen source of an $H_2/O_2$ fuel cell. Among the more common hydrogen storage materials are $LiAlH_4$ and $LiBH_4$. The reaction of lithium amide with water is also used for low temperature generation of hydrogen. Typical practical storage densities are on the order of 10% by mass of material, not considering system issues such as valving. Other types of hydrogen storage materials include methane, which can store up to 25% hydrogen by mass but being a gas requires storage means that can drive up system mass and volume. Methanol is an attractive choice based on cost and availability; however, hydrogen comprises only 12% by mass and, additionally, a high temperature reformer is required to access the hydrogen, driving up system volume and mass. Moreover, the reforming process produces CO and $CO_2$ that can poison the catalysts on the proton exchange membrane. Alanates can be attractive sources as well but require water to activate, are hazardous and, in some cases, form oxides upon reaction with water that inhibit further reaction from occurring.

In an attempt to overcome the problems associated with an $H_2/O_2$ fuel cell, attention has been drawn to the use of direct injection of beta particles into a p/n junction to generate electricity (cf. U.S. Pat. Nos. 5,606,213, Nuclear batteries; 6,774,531, Apparatus and method for generating electrical current from the decay process of a radioactive material; 5,721,462, Nuclear battery and 3,934,162, Miniaturized nuclear battery). However, conversion efficiencies for this process rarely exceed 1%, the reported lifetimes are very limited and these devices are capable of only producing very limited power.

SUMMARY OF THE INVENTION

Accordingly, the instant invention provides generally a method and system for the storage and generation of hydrogen that overcomes the shortcomings of prior art hydrogen generation schemes by using beta particles to degrade an organic polymer material thereby releasing pure hydrogen. A particular benefit of the invention is the ability to generate hydrogen for use in an air-breathing ($H_2/O_2$) fuel cell without the need for associated valving, tubing, reformers, shielding or high pressure storage means.

Beta particles (electrons) released from a beta particle emitting radioisotope, such as the radioisotope $^{63}Ni$, can be used to degrade an organic material, preferably a polymer material and most preferably an olefinic polymer material such as linear polyethylene, thereby releasing pure or substantially pure hydrogen (mass spectroscopic analysis of the gas produced by beta particle reaction with linear polyethylene showed >99% pure hydrogen). The generated hydrogen can be used in turn in an $H_2/O_2$ fuel cell. By separating the irradiated material from the active electrochemical generating material, the degradation of the electrical generating capacity with time is prevented. It is anticipated that the conversion of nuclear energy to electrical energy will exceed 4%. Because of the direct conversion of radioactive emission (beta particles) to hydrogen, the apparatus has no valves or other moving parts and, additionally, can be molded or formed into any shape. The olefinic polymer itself contains about 14 wt % hydrogen which is double the availability in the $LiAlH_4/H_2O$ system and rivals that available in NaSi complexes.

The invention provides several advantages over methods and systems presently employed. 1) No valving of reactants is required resulting in lower system volume than prior art fuel cell systems. 2) The device is only moderately affected by temperature; the radiation source is unaffected by temperature. It has been shown that between −77 and +55° C. there are only moderate differences in hydrogen production (T. Seguchi, *Irradiation Effects of Paraffins as Polymer Model Compounds*, Radiation Effects on Polymers, 442-456, 1991). 3) The materials are not particularly toxic or volatile compared to some hydrogen generation systems currently available, such as the alanite systems. 4) The system is extremely reliable since there are no moving parts or device control schemes used. 5) The system, constructed as a polymer film, provides for inexpensive and flexible processing. 6) The system is scalable to small sizes that can be employed for on-chip applications where the energy density of batteries is extremely poor.

A 100 µM thick Ni/Zn battery is only capable of storing about 50 $J/cm^3$ orders of magnitude less than the 7500 $J/cm^3$ the system disclosed herein is capable of producing.

Further features and advantages of the present invention, as well as the structure and operation of various embodiments of the present invention, are described in detail below with reference to the accompanying drawing.

BRIEF DESCRIPTION OF THE DRAWINGS

The accompanying drawing, which forms a part of the specification, illustrates one embodiment of the present invention and, together with the description, serves to explain the principles of the invention. The drawing is only for the purpose of illustrating one of the preferred embodiments of the invention and is not to be construed as limiting the invention. In the drawings.

DETAILED DESCRIPTION OF EMBODIMENTS OF THE INVENTION

Figure 1:
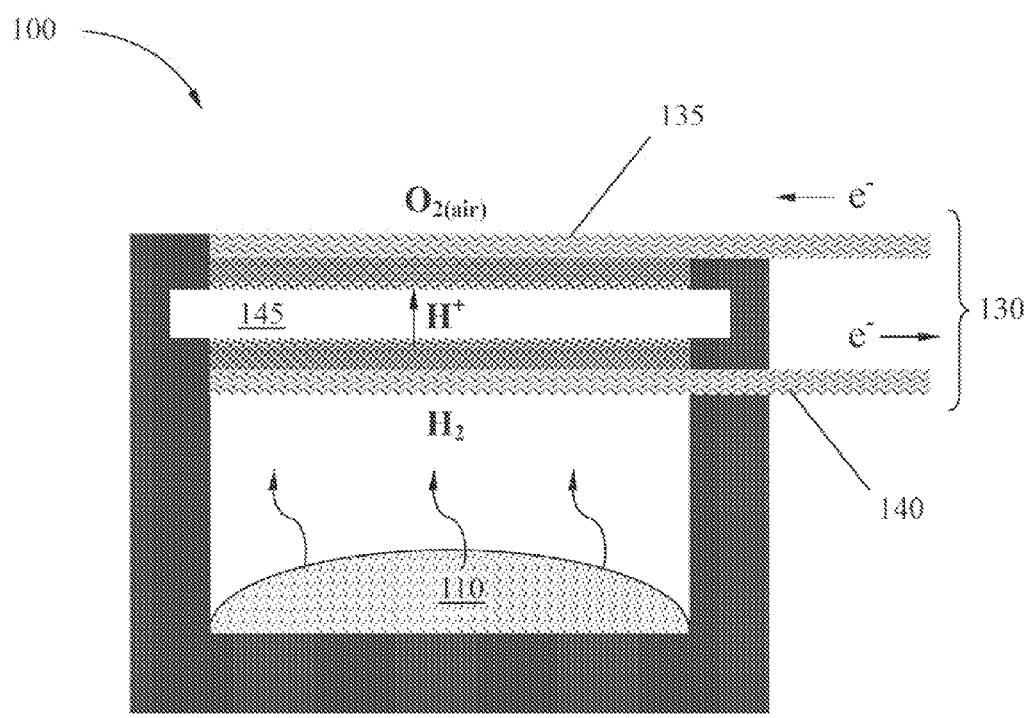
FIG. 1 is a schematic drawing of a fuel cell embodiment described below.

The instant invention is directed generally to a system for storing and generating hydrogen and, in particular, to a system for storing and generating hydrogen for use in a fuel cell system and particularly in an $H_2/O_2$ fuel cell.

The invention employs the fact that many organic polymer materials release substantially pure hydrogen when exposed to ionizing radiation, in particular ionizing beta radiation (cf. Seguchi, op. cit.). Pure olefinic polymers provide a potential source of pure hydrogen when exposed to energetic particles. Pure linear polyethylene, having the general formula —$CH_2$—, provides about 14% of the hydrogen available on the polymer. Shorter linear chains can generate about 15% because of the terminal $CH_3$ groups.

Referring now to FIG. 1, shows a fuel cell embodiment of the invention 100 and will be used to illustrate generally the operation of the invention. It is understood that the example of FIG. 1 is provided for purposes of clarifying and understanding of the principles of this invention. This invention may, however, be embodied in many different forms and should not be construed as limited to the embodiment set forth herein. The scope and extent of the invention being defined by the concluding claims.

The fuel cell 100 comprises a hydrogen generator 110, an intimate mixture of a beta particle emitter, preferably $^{63}Ni$, and an olefinic hydrocarbon polymer, preferably a linear hydrocarbon polymer and most preferably linear polyethylene. Hydrogen produced by the interaction of the beta particles (electrons) emitted by $^{63}Ni$ with the olefinic polymer diffuses to a membrane electrode assembly 130 comprising spaced apart electrodes 135 and 140 and a hydrogen transporting medium 145, such as a proton exchange membrane (PEM) disposed therebetween.

Of particular concern in an $H_2/O_2$ fuel cell is the possibility for oxygen diffusion from the air-breathing cathode through the proton exchange membrane and into the anode region to adversely affect the hydrogen evolution reaction or to oxidize the irradiated polymer creating CO and $CO_2$ radiolysis products thereby poisoning catalysts incorporated in the hydrogen anode. Oxygen scavengers can be used to remove the unwanted oxygen. In one aspect of the invention, cobalt salts are incorporated into the PEM to prevent oxygen from reaching the hydrogen anode region.

Beta particles from a $^{63}Ni$ source have such a short range they are unable to penetrate even the outer layer of skin. The maximum energy of beta particles from $^{63}Ni$ is about 67 keV and their penetration depth in polymer materials is about 64 μm. At the average energy of about 17 keV their penetration depth in polymers is about 5 μm. Their range in nickel varies from about 0.6 μm at average energy to about 8 μm at maximum energy. This indicates that for maximum hydrogen generation efficiency, submicron particles of $^{63}Ni$ intimately mixed in low volume ratio with a polyolefin is a desirable configuration for hydrogen generator 110. Alternatively, alternating layers of polyolefin and submicron thick $^{63}Ni$ sheets can also be used. The incorporation of hydrogen permeable materials or channels may be used to facilitate the release of evolved hydrogen.

Assuming hydrogen generation increases linearly with absorbed dose we can extrapolate from Seguchi's data (op. cit.) to determine the proportion of polyolefin to radionuclide appropriate for a fuel cell of a specific life. A 1% volume fraction (1 vol %) of $^{63}Ni$ (8% by mass) will initially produce 19 μW of electrical energy/$cm^3$ of mixture. Neglecting hydrogen depletion effects, the power will drop to about 17 μW/$cm^3$ over 13 years releasing about 7500 J electrical energy/$cm^3$. At that point most of the hydrogen available in the polyolefin has been removed.

Devices with a greater ratio of Ni to polyolefin will produce higher power densities over a shorter life. By way of example, at 26 vol % $^{63}Ni$, the power density peaks at about 134 μW electrical energy/$cm^3$ releasing about 5600 J electrical energy/$cm^3$ in 1.3 years. Larger volume fractions of Ni will reduce power density due to the decreased quantity of polymer and increased beta energy absorption in the Ni. For sufficiently fine Ni particle sizes (submicron) the fraction of energy deposited in the Ni will be comparable to the mass fraction of Ni in the mixture.

In contrast to conventional batteries, the device disclosed herein is substantially unaffected by temperature extremes, conditions under which the performance of traditional batteries would decline significantly. The performance of a conventional Zn-air battery at 0° C. is between 50% and 80% of its rated capacity, depending upon discharge conditions. By –18° C. the performance of the Zn-air battery is only 50% of capacity at under optimum conditions. There is no expectation that the performance of the device disclosed herein will degrade in performance over these temperature ranges.

While the invention has been illustrated using $^{63}Ni$ as the beta particle emitter, other beta-particle emitters such as $^3H$, $^{35}S$ and $^{45}Ca$ are also contemplated as being useful in various applications.

From the foregoing description and examples one skilled in the art can readily ascertain the essential characteristics of the present invention. The description and examples are intended to be illustrative of the invention and are not to be construed as limitations or restrictions thereon; the invention being delineated in the following claims. Moreover, to the extent necessary to understand or complete the disclosure of the present invention, all publications, patents, and patent applications mentioned herein are expressly incorporated by reference therein to the same extent as though each were individually so incorporated.

We claim:

1. A fuel cell, comprising:
   a hydrogen generating system comprising an organic polymer material in combination with a beta particle emitting material selected from the list consisting essentially of $^{35}S$, $^{45}Ca$ and $^{63}Ni$; and
   a membrane electrode assembly in communication with the hydrogen generating system.

2. The fuel cell of claim 1, wherein the membrane electrode assembly comprises two spaced apart electrodes having a hydrogen transport medium disposed therebetween.

3. The fuel cell of claim 2, wherein the hydrogen transport medium is a proton exchange membrane.

4. The fuel cell of claim 1, further comprising an oxygen scavenging material dispersed therein.

5. The fuel cell of claim 4, wherein the oxygen scavenging material is a cobalt salt.

6. The fuel cell of claim 1, wherein the organic polymer material is an olefinic polymer.

7. The fuel cell of claim 6, wherein the olefinic polymer is linear polyethylene.

8. The fuel cell of claim 1, wherein the beta particle emitting material is in the form of submicron particles.

9. The fuel cell of claim 1, wherein an amount of $^{35}S$, $^{45}Ca$ or $^{63}Ni$ in combination with the organic polymer material is at least 1% by volume of the organic polymer material.

* * * * *